(12) United States Patent
Bulusu et al.

(10) Patent No.: US 10,440,431 B1
(45) Date of Patent: Oct. 8, 2019

(54) ADAPTIVE AND AUTOMATIC VIDEO SCRIPTING

(71) Applicant: Amazon Technologies, Inc., Seattle, WA (US)

(72) Inventors: Prakash Bulusu, Bangalore (IN); Pragyana K. Mishra, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/362,722

(22) Filed: Nov. 28, 2016

(51) Int. Cl.
| | |
|---|---|
| *H04N 21/442* | (2011.01) |
| *H04N 21/84* | (2011.01) |
| *H04N 21/466* | (2011.01) |
| *H04N 21/234* | (2011.01) |
| *H04N 21/25* | (2011.01) |
| *H04N 21/81* | (2011.01) |
| *H04N 21/258* | (2011.01) |
| *H04N 21/45* | (2011.01) |

(52) U.S. Cl.
CPC . *H04N 21/44218* (2013.01); *H04N 21/23418* (2013.01); *H04N 21/252* (2013.01); *H04N 21/25891* (2013.01); *H04N 21/4532* (2013.01); *H04N 21/4666* (2013.01); *H04N 21/4667* (2013.01); *H04N 21/812* (2013.01); *H04N 21/84* (2013.01)

(58) Field of Classification Search
CPC .................................................. H04N 21/8549
See application file for complete search history.

(56) References Cited

U.S. PATENT DOCUMENTS

| | | | | |
|---|---|---|---|---|
| 2005/0096899 | A1* | 5/2005 | Padhi | G10L 15/10 704/216 |
| 2006/0165379 | A1* | 7/2006 | Agnihotri | G06F 17/30787 386/231 |
| 2009/0007202 | A1* | 1/2009 | Williams | G06F 17/30787 725/105 |
| 2017/0064300 | A1* | 3/2017 | Yang | H04N 19/107 |
| 2017/0109584 | A1* | 4/2017 | Yao | G06K 9/00718 |

* cited by examiner

*Primary Examiner* — Nasser M Goodarzi
*Assistant Examiner* — Adil Ocak
(74) *Attorney, Agent, or Firm* — Knobbe, Martens, Olson & Bear, LLP

(57) ABSTRACT

Systems and methods are provided for facilitating automated video scripting. Video frames may be analyzed to determine scores indicative of the association between a characteristic of the video frame and an attribute of a theme associated with a particular person. Then, video frames with particular scores can be added together to automatically create a video script. Neural networks can be used to determine the scores. The neural network may also be trained using training data, and updated based on the interaction of a person to a video script.

20 Claims, 9 Drawing Sheets

FIG. 2

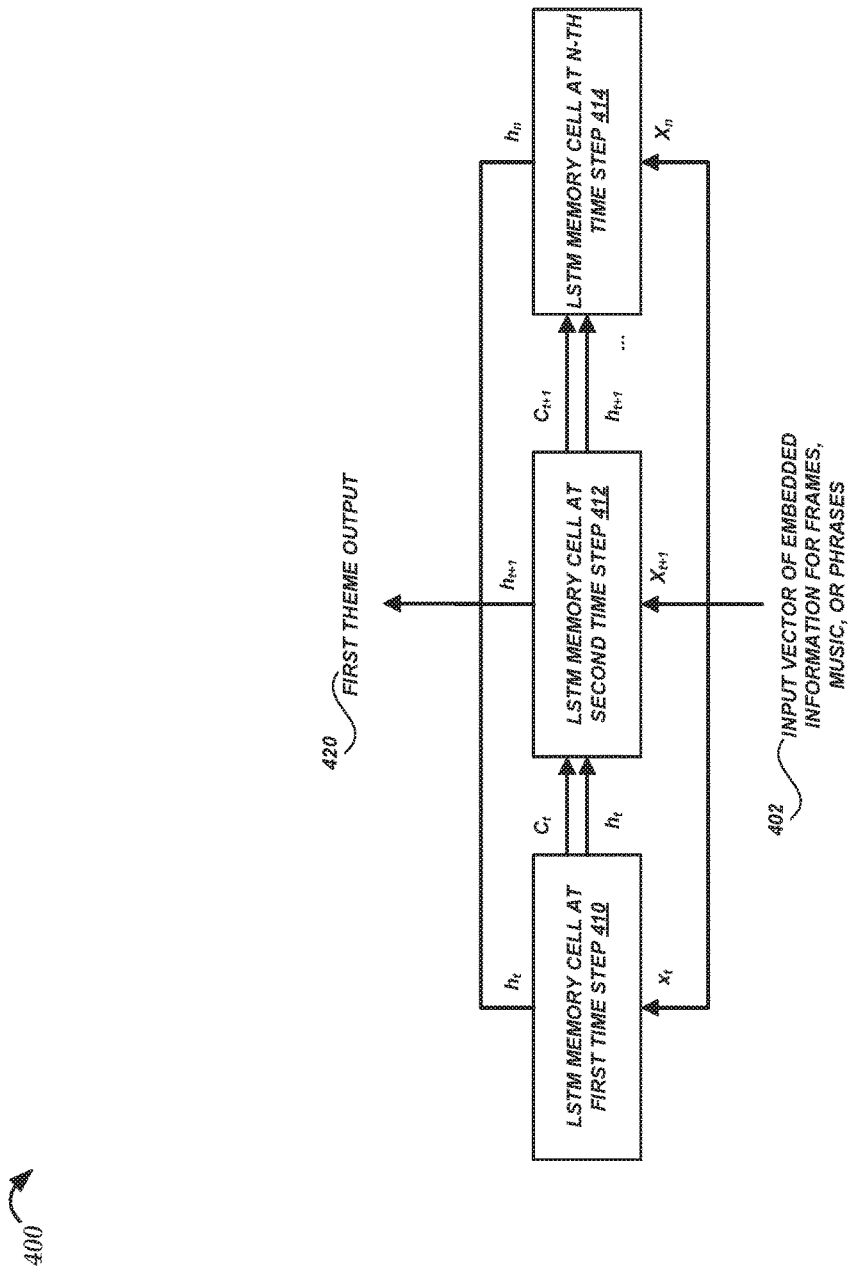

ADAPTIVE AND AUTOMATIC VIDEO SCRIPTING

BACKGROUND

Typically, videos are manually produced using standard editing techniques. Videos are often used as a tool to target a particular audience. For example, a writer creates a script with a story line that appeals to a particular audience. Then, a production company can handle shooting and editing of the video. Producers manually pick the scenes that are relevant to the objective of the video. Example objectives include creating a movie trailer, or advertising a service or product. Video editors can find music and text to attach to the videos that synergize with the particular objective.

Once a video is created for a particular audience, companies have identified ways to target the video to a particular audience. For example, television broadcasting networks can decide to broadcast commercials directed to children on a cartoon network between the times of 3:00 to 6:00 PM when children are coming home from school, or broadcast movie trailers directed to college students on a talk show after midnight. Some internet-based companies have used data collected about their subscribers to identify particular interests, and have targeted advertisements pertaining to those interests.

Nevertheless, creating videos targeted to a particular audience typically involves the work of a variety of different parties, a myriad of manual processes and decisions, and a lot of time and money.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein:

FIG. 2 is a block diagram depicting the three sample video scripts shown in FIG. 1 augmented with audio data such as voice and music;

FIG. 4A is a block diagram depicting an illustrative long short-term memory ("LSTM") neural network video scripting model that produces an output score associated with a particular theme;

DETAILED DESCRIPTION

Figure 1:
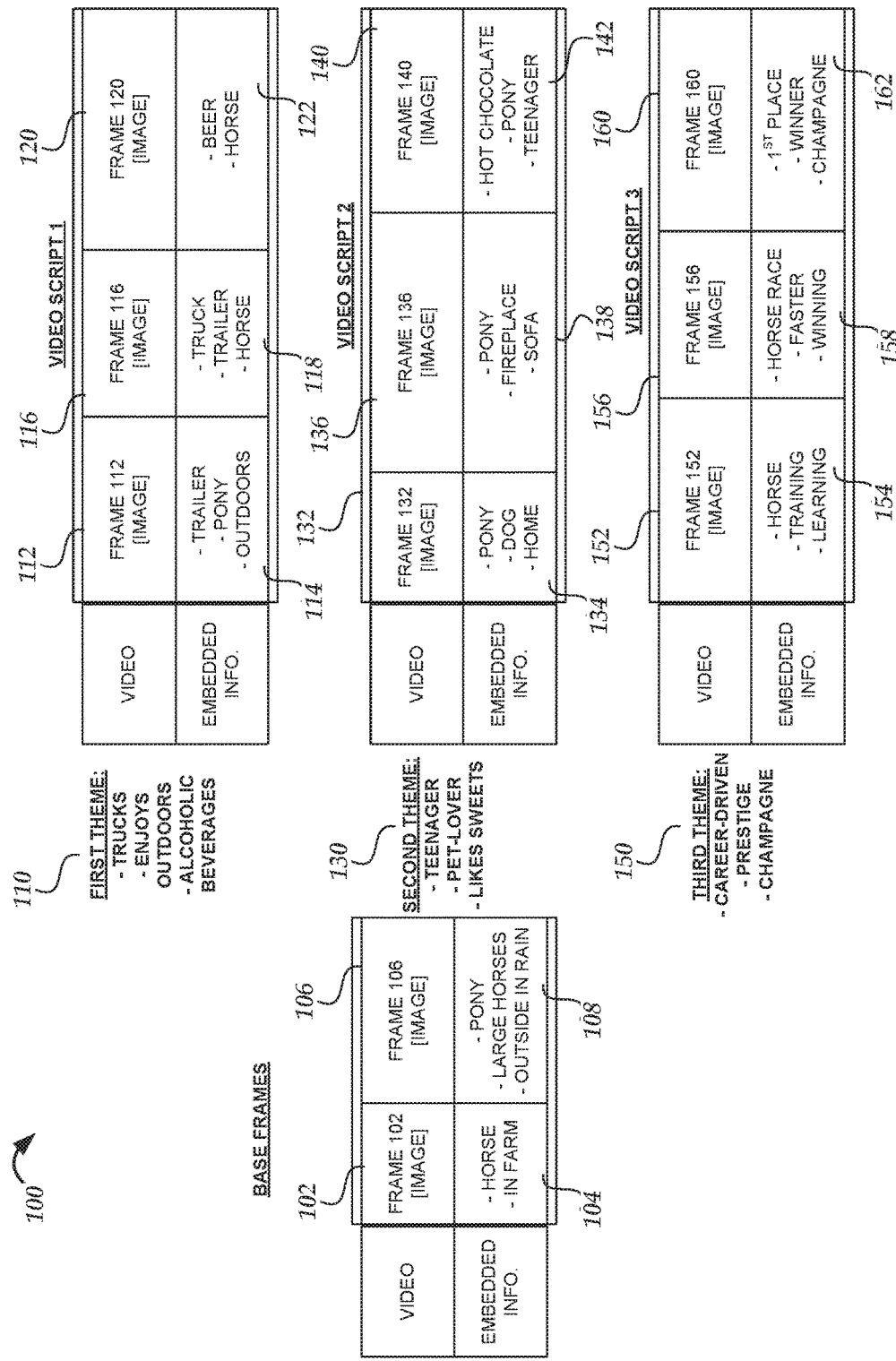
FIG. 1 is a block diagram depicting multiple sample video scripts generated in accordance with the present disclosure, each sample video script corresponding to a different theme.

Generally described, aspects of the present disclosure relate to automated video scripting. Some embodiments of the present disclosure enable the automatic generation of targeted advertisements that are tailored toward the needs, desires, and history of a particular viewer or group of viewers. This customization can radically change the way advertisements are presented to viewers and improve the effectiveness of the advertisement. For instance, different advertisements for the same product can be automatically generated from the same source material for presentation to different viewers. Furthermore, patterns, trends, and preferences can be derived from large data sets (e.g., big data, browser data, purchase history) and used in automatically generating different advertisements for different viewers. For example, using the same source material (e.g., the same film, the same collection of scenes, the same long-form video, etc.), merchants, retailers, manufacturers, service providers, and any others that need to tailor an advertisement to a viewer, can automatically generate advertisements for different viewers with little or no manual effort, and with little or no help from advertisement agencies, creators, publishers, or artists.

In some embodiments, neural networks can be used to automatically generate, from a complete or larger collection of video frames (such as a complete film or a number of scenes), a collage of video frames (e.g., a video script) directed to a particular theme. A theme, as used herein, can be directed to a viewer such as a person, a group of people, an audience, an organization, and/or other entities that can be targeted for a video, such as an advertisement. Themes can include one or more attributes of the entities, such as demographic data, sex, race, economic status, age, level of education, income level and employment, psychiatric data, medical data, a personality trait, an interest, values, attitudes, lifestyles, opinions, preferences, likes or dislikes, predilections, purchase history, browser history, financial history and data, credit history and data, personal history and data, other activity data, and the like. An example theme may be directed to a person who is middle-aged, enjoys the outdoors, and is vegetarian. An attribute may include a computing device (such as a cell phone, or a computer), a channel of communication (such as television. Internet, or a website), advertising media (such as a billboard or commercial), social media (such as a user profile or friends list on a social media website), a particular profile (financial profile for a certain region, subscriber profile for subscribers on a particular website, social media profile for a particular age), other information that can be used to direct a script to, and the like.

Viewers may be associated with different themes, and thus, different video scripts may be created for different viewers. Neural networks can be trained to identify video frames that are associated with these attributes or to a particular theme. The video frames identified by the neural network can then be added to a video script.

A neural network can be trained for a particular person, theme, or attribute by using a collection of video frames that are associated with a particular person, theme, or attribute. A commonality can be identified across the collection of video frames. The commonality can be indicative of an attribute, a theme, or a person. Furthermore, a commonality may be used to define an attribute, a theme, or an audience of persons. Then, a preferred output score associated with the commonality can be generated. The neural network can then be trained by inputting data for each of the video frames, and the neural network can output at least one output score. The output score can be assessed with the preferred output score. Then, the neural network can be adjusted to produce an output score that is closer to the preferred output score.

A neural network can be trained using training data, which will be described further below. The training data can include training input vectors, and preferred output scores. The training input vectors can be inputted into the neural network and the neural network can output at least one output score. This output score can be assessed with a preferred output score to determine how much the output score of the neural network differs from the preferred output score. The neural network can then be adjusted to output a score that is closer to the preferred output score. In some embodiments, the neural network is a long short-term memory ("LSTM") neural network.

In some embodiments, the trained neural network is used to create a video script directed to the theme. Data associated with individual video frames (e.g., embedded information that can be indicative of a characteristic of a video frame) of a collection of video frames can be input into the trained neural network. Embedded information, as used herein, is data pertaining to the video frame. Embedded information can include identified objects within the video, metadata, video formats, a source or an author, text within the video, words spoken in the video, characteristics of background music, the mood, lighting, setting, the feeling of the video, history of broadcast, targeted audience data, an aspect ratio, color, a pattern, an identifiable person, depth information, location information, other information pertaining to the video, and the like. Embedded information may be determined using image classification, image recognition, and/or other technology. Embedded information may also include the actual video itself, such as video data of the entire video frame, or a subset or portion of the video frame.

The trained neural network outputs at least one output score for the data set associated with each video frame. Then, a video frame may be selected based on the output score. For example, a video frame associated with the highest output score is added to the video script. Video frames may be assessed as to whether the output scores satisfy a static or calculated threshold. Each video frame may also be assessed by multiple output scores to determine which are added to the video script. This process can be repeated until a full video script is created.

Output scores, as used herein, refer to the video frame's association with an attribute, a theme, or a person. An output score may be a range, a value, a yes or no, plus or minus, or any other way to convey an association to an attribute, a theme, or a person. The output score may represent the association of a portion or subset of the video frame to an attribute, a theme, or a person. The output score may also represent the association of multiple video frames to an attribute, a theme, or a person.

Each video frame can be a frame or portion of data from a larger collection of frames or data, such as a film, movie, a televisions show advertisement, longer video, etc. The larger collection of frames or data may be referred to herein as "source material" for the video script(s) generated. The source material may be locally stored or obtained via a network from a third party resource such as a video repository or library. A video frame may include visual, textual and/or audio data or content, and thus, may also be referred to herein as a "content frame."

In some embodiments, another trained neural network is used to create another video script directed to another theme, attribute, or person. In such cases, data associated with the same collection of video frames used in the trained neural network can be used in another trained neural network to create a different video script. Thus, different video scripts may be generated from the same source material for a variety of different viewers associated with different themes. Moreover, multiple video scripts, each associated with a different theme or attribute, may be generated for a single viewer.

Audio, text, and speech may also be automatically added to a video script. For example, background music for the video script that is associated with attributes of the theme of the video script is selected. A text portion may also be selected for the video script in a similar manner, which text can be displayed or spoken as the video script is presented to a viewer.

In yet other embodiments, a video script generated in accordance with the present disclosure may include one or more base frames that are commonly shared among multiple video scripts. These base frames may comprise frames that are required to be included in the video script. The base frames may be selected based on a particular service or product being advertised, a particular brand, an event, a show, a person, other reasons to create the video clip, and the like. The neural network can be used to add frames to the base frames to create a video script.

Once generated, a video script is sent to a viewer for presentation. The viewer's interaction with the video script during presentation may then be collected and used to update the trained neural network. In this manner, subsequent video scripts generated by the updated, trained neural network may be improved.

FIG. 1 is a block diagram depicting multiple sample video scripts generated in accordance with the present disclosure, each sample video script corresponding to a different theme. In the illustrated example, two base frames 102, 106 are depicted. The base frames 102, 106 are frames that can be included in multiple video scripts generated in accordance with the present disclosure. In other embodiments, more or less base frames 102, 106 may be included. In the illustrated example, base frames 102, 106 are added to the beginning of each of the video scripts generated from the same source material. However, the base frames 102, 106 can be added to other parts of the video scripts (e.g., in the middle, at the end, etc.). In the illustrated example, the source material is a film about a championship racehorse raised on hum. Thus, the first base frame 102 is a video frame including an image of a horse on a farm. The second base frame 106 is a video frame including an image of a pony among horses standing in the rain.

Embedded information is data pertaining to the video frame that is used to determine an output score for the video frame. The output score is assessed to determine whether the video frame will be added to the video script. For example, the embedded information 104 for the first base frame 102 includes "horse" and "in farm," while the embedded information 108 for the second base frame 106 is "pony," "large horses," and "outside in rain." As will be described in more detail below, embedded information for the base frames 102, 106 may be used to identify additional video frames to add to a video script.

Three sample themes are shown in FIG. 1. In this example, each of the three themes includes three attributes. A theme can be representative of a particular audience of people. For example, a theme with three attributes can represent an audience of people that may have a preference toward at least one of the attributes. The first theme 110 is associated with a viewer that likes trucks, enjoys the outdoors, and enjoys alcoholic beverages. The second theme 130 is associated with a viewer that is a teenager, a pet-lover, and that likes sweets. The third theme 150 is associated with a viewer that is career-driven, enjoys prestige, and likes to drink champagne. It will be appreciated by one skilled in the art that a fewer or greater number of different video scripts may be generated for more or less themes. In the example of FIG. 1, a first video script 1 is depicted as generated for the first theme 110. However, in other embodiments, multiple video scripts can be generated for a single theme, and multiple themes can be used to create a single video script.

As will be discussed in more detail below, video frames that are associated with a theme, attribute, or a person can be added to a video script or aggregated to form a video script. The association of a video frame to an attribute, a theme, or a person can be determined by an output score. A neural network may be used to determine the output score. Using a neural network, a large number of video frames can be quickly and automatically assessed to determine an output score indicative of an association between each video frame and the theme, or an association between two or more video frames, the theme, and one or more base frames.

In the example illustrated in FIG. 1, the neural network is trained to identify video frames associated with the base frames. In particular, the neural network is trained to identify characteristics of video frames that are associated with the characteristics of the base frames. The base frames 102, 106 have embedded information 104, 108 that both include either a horse or a pony. Thus, the neural network can be trained to identify video frames that include a horse or a pony. Frame 112 of video script 1 is an image of a pony near a trailer, and other large horses in an outdoor area. The embedded information 114 for frame 112 is "trailer," "pony," and "outdoors." Frame 116 of video script 1 is an image of a truck with a trailer and a horse, and the embedded information 118 for frame 116 is "truck," "horse, and "trailer." Frame 120 is an image of a person drinking beer with a horse, and the embedded information 122 for frame 120 is "beer" and "horse." In this example, the embedded information 114, 118, 122 for the frames 112, 116, 120 include ponies or horses. Thus, the frames 112, 116, and 120 are associated with base frames 102, 106.

As shown, the video frames can be of different lengths. For example, frame 120 is longer than frame 112. However, the frames can be of the same length. Furthermore, the video scripts are shown to be of the same total length. However, the video scripts can be of different lengths.

Moreover, video script 1 is generated for the first theme 110, i.e., for a viewer that likes trucks, enjoys the outdoors and enjoys alcoholic beverages. Thus, the neural network is also trained to identify video frames that are associated with the first theme 110. In particular, the neural network is trained to identify associations between the characteristics of the video frames and the attributes of the theme.

Embedded information 114 includes the outdoors and a trailer, embedded information 118 includes a trailer and a truck, and embedded information 122 includes beer. Thus, the characteristics of the frames 112, 116, 120 indicated in the embedded information 114, 118, and 122 are associated with attributes of the first theme 110 for including the outdoors, trucks, and alcoholic beverages.

As also illustrated in FIG. 1, frame 132 is an image of a pony and a dog near the door of a home. The embedded information 134 for frame 132 is "pony," "dog," and "home," Frame 136 is an image of a teenager seated on a sofa in front of a fireplace and a pony, and the embedded information 138 for frame 136 is "fireplace," "pony," and "sofa." Frame 140 is an image of a teenager drinking hot chocolate with a pony, and the embedded information 142 for frame 140 is "hot chocolate," "teenager," and "pony." In this example, the embedded information 134, 138, 142 for the frames 132, 136, 140 include ponies and horses. Thus, characteristics of frames 132, 136, 140 are associated with the characteristics of base frames 102, 106 by including either a pony or a horse.

Video script 2 is generated for the second theme 130, i.e., for a viewer who is a teenager, a pet-lover and likes sweets. Embedded information 134 includes a dog, embedded information 138 includes a fireplace and a sofa, and embedded information 142 includes a teenager drinking hot chocolate. Thus, characteristics of frames 132, 136, 140 are associated with attributes of the second theme 130 for including a home, fireplace, dog, and hot chocolate.

Frame 152 is an image of a horse training for a race and learning particular skills for a race. The embedded information 154 for frame 152 is "horse," "training," and "learning." Frame 156 is an image of a horse in a race beginning in middle place but accelerates ahead of the other horses, and the embedded information 158 for frame 156 is "horse race," "faster," and "winning." Frame 160 is an image of a winner of a horse race standing on the podium drinking champagne, and the embedded information 162 for frame 160 is "first place," "winner," and "champagne." In this example, the embedded information 154, 158, 162 for the frames 152, 156, 160 include ponies and horses, Thus, characteristics of frames 152, 156, 160 are associated with characteristics of the base frames 102, 106 for including a pony or a horse.

Video script 3 is generated for the third theme 150, i.e., for a viewer who is career-driven, enjoys prestige and likes champagne. Embedded information 154 includes training and learning, embedded information 158 includes a competition and winning, and embedded information 162 includes a winner of a competition and champagne. Thus, characteristics of frames 152, 156, 160 are associated with attributes of the third theme 150 for including a horse learning, training, winning, and champagne.

Figure 2:
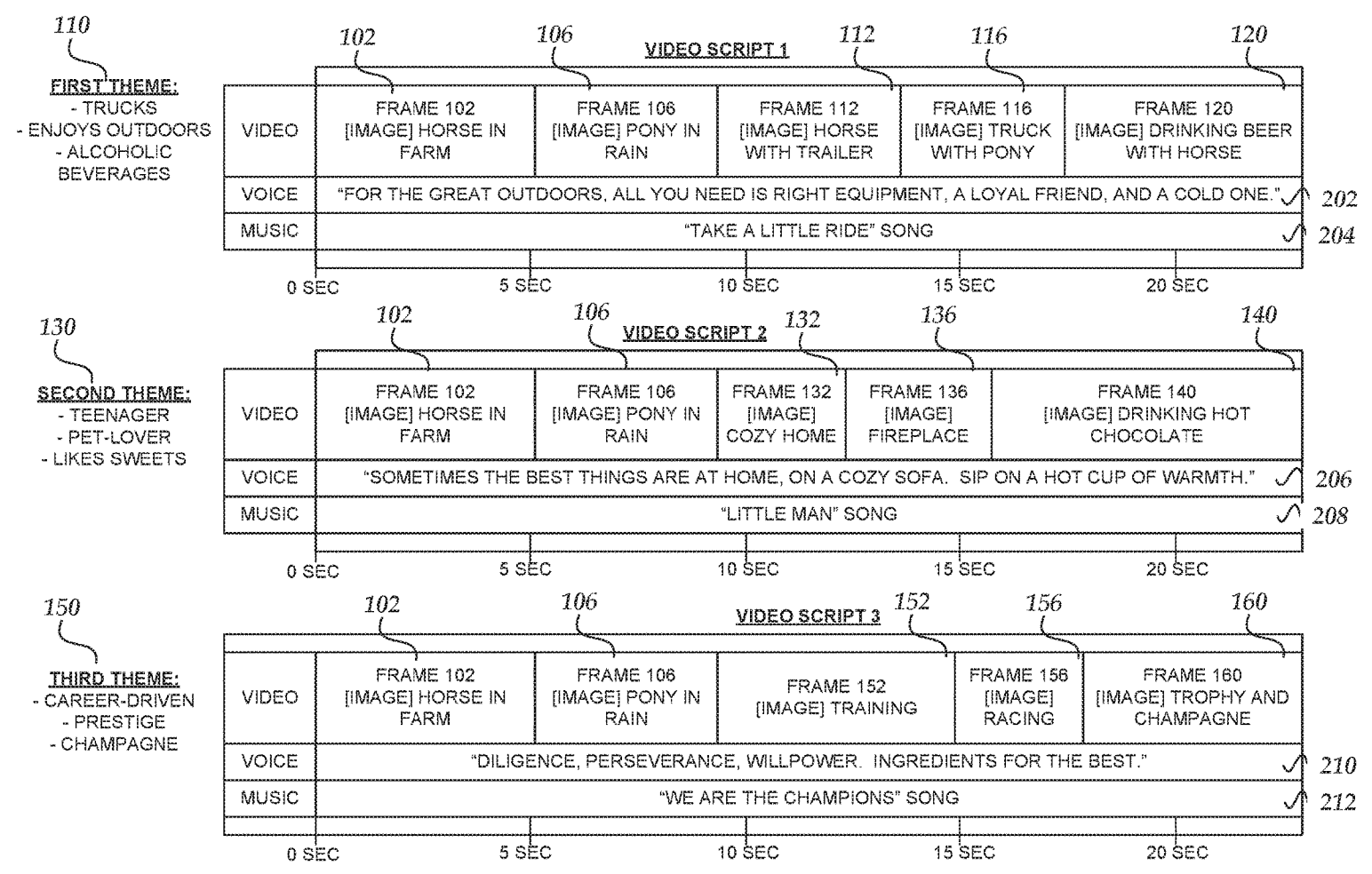

FIG. 2 is a block diagram depicting the three video scripts shown in FIG. 1 augmented with audio data such as voice and music. In some embodiments, audio segments, including a voiceover and/or background music, are added to a video script. Text segments can also be added to a video script. Audio or segments can be selected from any collection of audio or (e.g., audio from a movie or audiobook, text from a book or magazine, text from a webpage, or the like). Text segments can also be generated from image recognition or video classification of the video frames of the source material. For example, video frame 120 shows a person drinking beer, and thus, "alcohol," "beer," and "cold one" can be among words of a text segment extracted from the video frame. A text segment can be given an output score based on its association to an attribute of a theme or a characteristic of a base frame in a manner similar to how a video frame can be given an output score. Text segments corresponding to the theme can then be aggregated and included in the video script, or otherwise added to the video script.

Neural networks can be used to generate an output score for the text segment. In some embodiments, neural networks can be used to generate an output score for a single word, phrases, sentences, or models. The output scores can be used to determine an association with a particular classification (e.g., convolutional networks for sentence classification). Phrases, sentences, or paragraphs can also be scored. Instead of a voice, other forms of communication can be used (e.g., displaying text). The example shows a voiceover throughout the entire video script. However, the words can be communicated in segments (e.g., at time intervals, during specific frames).

Music, voice, and/or text can be selected by determining an output score that indicates the association of the music to attributes of a theme or characteristics of a base frame. The output score can be determined using a neural network. For example, data associated with the background music can be identified, such as the music's embedded information, Such embedded information can include the artist, the band, lyrics; genre, tempo, musical instruments, other aspects of the music, and the like.

This embedded information may be inputted to a separate neural network trained to identify music, voice, and/or text, with input vectors tailored to music, voice, and/or text. This neural network can be trained using similar or different training data. For example, a neural network for video frames can receive input vectors that include color, text, and object recognition data, while a neural network for music can receive input vectors that include tempo, artist, and lyrics.

In some embodiments, the same neural network used to identify video frames can be used to identify music, voice, and/or text. The embedded information can be formatted similarly for video, music, voice, and/or text. The neural network can also be able to receive different forms of input vectors but be trained to output scores indicative of the same attributes of themes or characteristics of base frames.

Referring again to FIG. 2, a voiceover 202 including one or more audio segments has been added to video script 1 directed to the first theme 110. The voiceover 202 says for the great outdoors, all you need is right equipment, a loyal friend, and a cold one." Based on the association of the words to the first theme's attributes, audio segments including the terms "outdoors," "equipment," "loyal," and "cold one" were chosen for the voiceover 202. Voiceovers, such as voiceover 202, can be displayed or voiced at a particular time, or displayed or voiced throughout the video script. For example, "for the great outdoors" can be spoken between 0 to 3 seconds, "all you need is right equipment" spoken between 10 to 1.2 seconds, a loyal friend" spoken between 15 to 17 seconds, and "and a cold one" displayed as text and spoken between 20 to 23 seconds."

As also shown in FIG. 2, a different voiceover 206 may be generated in accordance with the present disclosure and added to video script 2 directed to the second theme 130. As noted above, the second theme 130 is directed to a viewer that is a teenager, is a pet lover, and likes sweets, Thus, the voiceover 206 says "sometimes the best things are right at home, on a cozy sofa, sip on a hot cup of warmth." Based on the association of the words to second theme's attributes, audio segments including terms such as "home," "cozy," "sofa," and "warmth" were chosen for the voiceover 206.

Similarly, yet another voiceover 210 may be generated and added to video script 3 directed to the third theme. As noted above, the third theme 150 is directed to a viewer that is career driven, enjoys prestige and likes champagne. Thus, the voiceover 210 says "diligence, perseverance, willpower, ingredients for the best," Based on the association of the words to the third theme's attributes, audio segments including terms such as "diligence," "perseverance," "willpower," and "the best" were chosen for the voiceover 210.

A similar process may be used to add background music to a video script. Appropriate background music can be identified and added based on the association between the background music and the theme. The music can be chosen by performing text classification and modeling based on the lyrics of the words of the song. Music genre classification using neural networks may also be used to determine the association between background music and a theme. In some embodiments, as mentioned above, similar neural networks can be used by inputting embedded information of music into the neural network and assessing the output scores for each piece of music. In the example, the music is playing throughout the video script. However, it is appreciated that more than one piece of music may be played, or a video script created without background music.

For example, the song "take a little ride" is chosen as the background music 204 for video script 1. The song lyrics include "bailin" some hay," "grab a little Shiner Bock", "shine the old truck up," "ride this Chevy," and "watch the corn grow." A neural network can output a high output score for these phrases indicating a strong association to attributes of the first theme 110. For example, the words "hay" and "corn" can be associated with the attribute "outdoors," "Shiner Bock" associated with the attribute "alcoholic beverages." and "Chevy" and "truck" associated with the attribute "trucks."

The song "little man" is chosen as the background music 208 for video script 2. The song lyrics include "little," "close to me," and "learned what it meant to be mature." These phrases can generate high output scores indicating a strong association with attributes of the second theme 130. For example, "little," "mature." and "close to me" can be associated with the attribute "teenager."

The song "we are the champions" is chosen as the background music 212 for video script 3. The song lyrics include "paid my dues," "champions," "fighting 'til the end," "fame and fortune." High output scores can be generated for these phrases indicating that the phrases are associated with the attributes of the third theme 150. For example, "champions," "fighting 'til the end," "fame," and "fortune" can be associated with the attribute "career-driven," and "champions," "fame," and "fortune" associated with the attribute "prestige."

Figure 3:
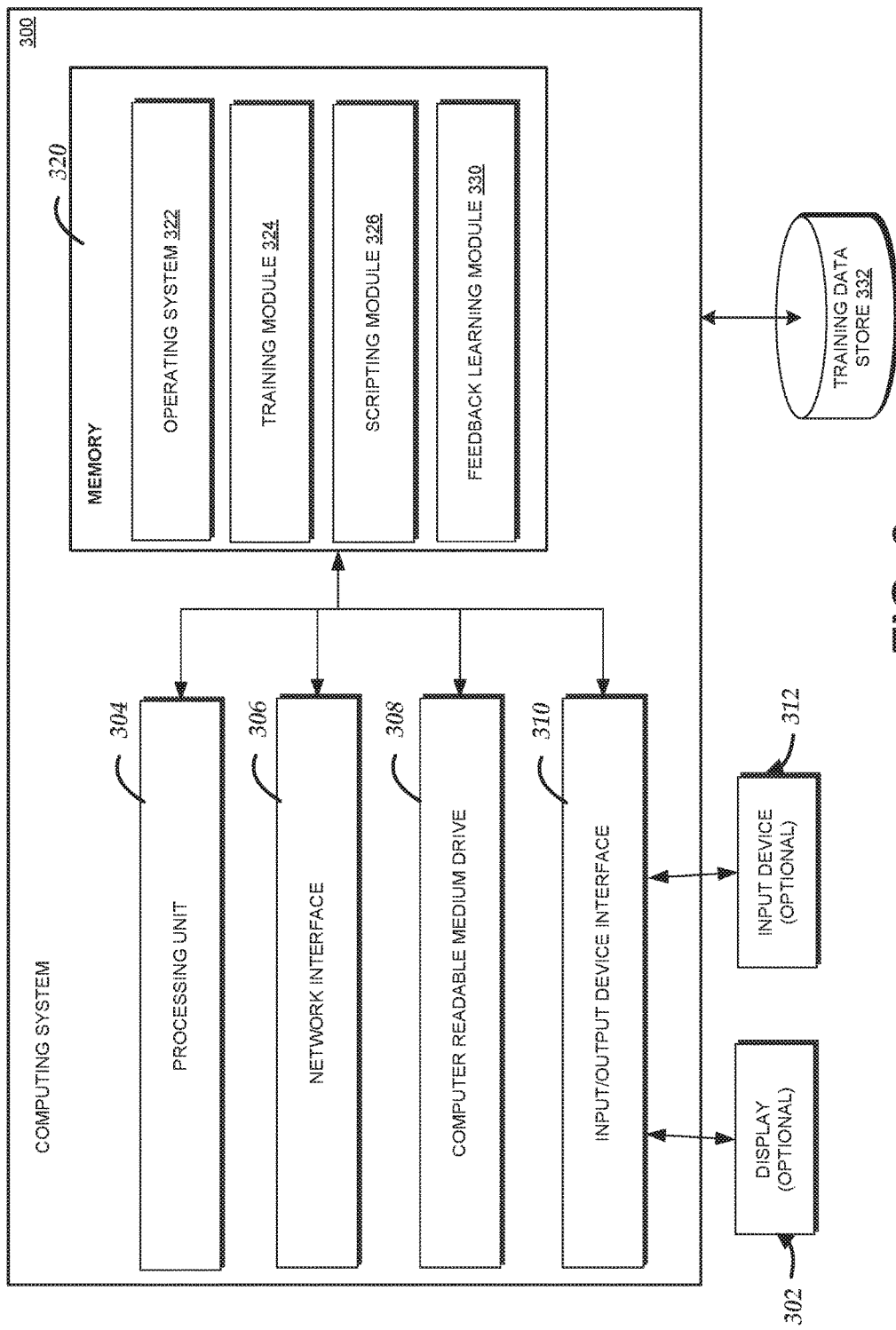
FIG. 3 is a block diagram depicting an illustrative configuration a computing system that may generate video scripts in accordance with the present disclosure.

FIG. 3 is a block diagram depicting an illustrative configuration a computing system that may generate video scripts in accordance with the present disclosure. The general architecture of computing system 300 depicted in FIG. 3 includes an arrangement of computer hardware and software components that may be used to implement aspects of the present disclosure. As illustrated, the computing system 300 includes a processing unit 304, a network interface 306, a computer readable medium drive 308, an input/output device interface 310, a display 302, and an input device 312, all of which may communicate with one another by way of a communication bus. The network interface 306 may provide connectivity to one or more networks or computing systems. The processing unit 304 may thus receive information and instructions from other computing systems or services via a network. The processing unit 304 may also communicate to and from memory 320 and further provide output information for an optional display 302 via the input/output device interface 310. The input/output device interface 310 may also accept input from the optional input device 312, such as a keyboard, mouse, digital pen, etc. n some embodiments, the computing system 300 may include more (or fewer) components than those shown in FIG. 2. For example, some embodiments of the computing system 300 may omit the display 302 and input device 312, while providing input/output capabilities through one or more alternative communication channel a via the network interface 306).

The memory 320 may include computer program instructions that the processing unit 304 executes in order to implement one or more embodiments. The memory 320 generally includes RAM, ROM and/or other persistent or non-transitory memory. The memory 320 may store an operating system 322 that provides computer program instructions for use by the processing unit 304 in the general administration and operation of the computing system 300. The memory 320 may further include computer program instructions and other information for implementing aspects of the present disclosure. For example, in one embodiment, the memory 320 includes person interface software that generates person interfaces (and/or instructions therefor) for display upon a computing device, e.g., via a navigation interface such as a browser installed on the computing device. In addition, memory 320 may include or communicate with one or more auxiliary data stores, such as the training data store 332, which may correspond to any persistent or substantially persistent data storage, such as a hard drive (HDD), a solid state drive (SDD), network attached storage (NAS), a tape drive, or any combination thereof.

In addition to the person interface module, the memory 320 may include a training module 324 that may be executed by the processing unit 304. The training module 324 may be used to train a neural network using data retrieved from the training data store 332. The memory 320 may also include a scripting module 326 used to determine which video frames, audio segments or text segments to add to the video scripts, as shown in FIGS. 1 and 2. In some embodiments, the memory 320 includes the feedback learning module 330 used to update the neural network based on history data. History data can include data regarding interaction of a viewer with a video script as the script is presented to the viewer. A module may include one or more computer-executable instructions, that when executed by a processor, such as processing unit 304, perform one or methods as specifically described below.

While the training module 324, the scripting module 326, and the feedback learning module 330 are shown in FIG. 3 as stored in memory 320 of the computing system 300, in other embodiments, all or a portion of these modules may be implemented by alternative computing devices, such as virtual computing devices within a hosted computing environment.

FIG. 4A is a block diagram depicting an illustrative LSTM neural network video scripting model that produces an output score associated with a particular theme, in connection with the neural network used in FIGS. 1 and 2, and the LSTM neural network that can be used for FIG. 3. FIG. 4A illustrates an example of a single LSTM neural network that can generate output scores for the first theme 110. It is appreciated that a single or multiple neural networks can be used for each of the themes. The LSTM neural network of FIG. 4A can be used to implement the scripts of FIGS. 5A, 5B, 6, and 7, as will be described in more detail below.

As shown, the LSTM neural network 400 can include LSTM memory cells 410, 412, 414 at different time steps. The LSTM memory cell 410 is at a first time step, with input $x_t$, which is the input vector of embedded information for frames, music, or phrases 402. Because this is the LSTM memory cell 410 at the first time step, a previous cell state $C_{t-1}$ and a previous output score $h_{t-1}$ may not exist. The previous cell state $C_{t-1}$ and previous output score $h_{t-1}$ can be generated. However, in other embodiments, the previous cell state $C_{t-1}$ and the previous output score $h_{t-1}$ can be known, accessed, inputted, and the like (such as determined from training the LSTM memory cells).

The LSTM memory cell at the first time step 410 outputs the output score $h_t$ to the first theme output 420. The LSTM memory cells can output a score for a particular theme, attribute of a theme, or a person associated with a theme. The LSTM memory cell at the first time step 410 also outputs the output score $h_t$ to the LSTM memory cell at a second time step 412. The LSTM memory cell at the first time step 410 generates a new cell state and outputs the new cell state to the LSTM memory cell at the second step 412. Thus, the LSTM memory cell uses values computed from previous LSTM memory cells, also referred to as temporal learner values, at prior time steps in its own computations.

The LSTM memory cell at the second time step 412 can perform similar computations as the LSTM memory cell at the first time step 410, except with the output score $h_t$ and cell state $C_t$ of the LSTM memory cell at the first time step 410, and an input $x_{t-1}$ of a different input vector 402. The LSTM memory cell at the second time step 412 computes a new output score $h_{t+1}$ and cell state $C_{1+1}$ for a next time step. The LSTM memory cell at the second time step 412 outputs the new output score $h_{t+1}$ and cell state $C_{t+1}$ to the LSTM memory cell at the next time step, and repeats until an N-th time step. The LSTM memory cell at the second time step 412 also outputs the new output score $h_{t+1}$ to the first theme output 420. The LSTM memory cell that is at a third time step (not shown in FIG. 4A) uses the data from the LSTM memory cell at the second time step 412, and by doing so may also be using data from the LSTM memory cell at the first time step 410 depending on how the cell state and output scores are computed by the LSTM memory cell at the second time step 412 (e.g., the cell state and output scores of the LSTM memory cell at the second time step 412 can be derived at least in part from the cell state and output scores of the LSTM memory cell at the first time step 410). Thus, the temporal learner values may persist in the LSTM memory cells for more than a single time step.

The LSTM memory cells in the LSTM neural network of FIG. 4A are chained together serially, and pass cell state and output score values to the LSTM memory cell in the next time step. Because LSTM memory cells receive input from the LSTM memory cells of the prior time step, the LSTM memory cells can use information in previous time steps in its determination going forward, thus containing a temporal learner component. The LSTM neural network can use the cell state and output score values to allow information to persist in the neural network by passing it onto the next LSTM memory cell in the subsequent time step.

Figure 4B:
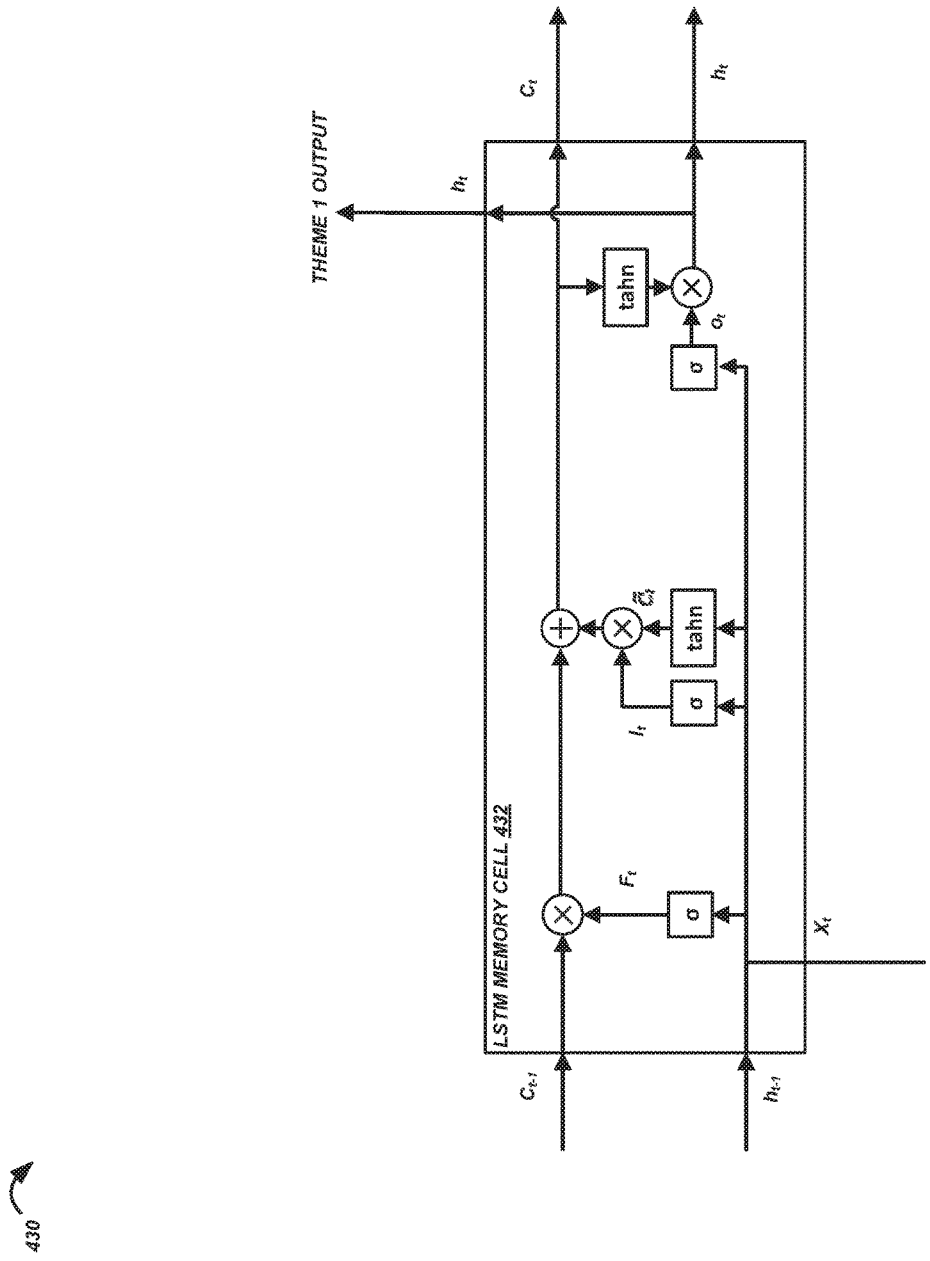
FIG. 4B is a block diagram depicting an example LSTM memory cell of FIG. 4A in further detail.

To tie the description of FIG. 4B back to FIGS. 1 and 2, information from previous video frames can be used in determining what information should come next. For example, after deciding that Frame 112 should be the first added video frame of the first video script 1, the LSTM neural network can retain information on the currently existing video frames (e.g., frames 112, 106, and 102) by passing such information from one LSTM memory cell to the next LSTM memory cell in subsequent time steps, such that the LSTM neural network that decides to add frame 116 to the video script 1 may have considered information from frames 112, 106, and 102. For example, not only is the LSTM neural network tailored toward identifying frames that are best suited for a particular theme or attribute of a theme for a person, but may also determine which video is also best fitted based on the previous frames.

FIG. 4B is a block diagram depicting an example LSTM memory cell in further detail. FIG. 4B illustrates one example on how an LSTM memory cell can use the cell state and output score to allow such information in previous time steps to persist and be used in its current computation.

The example LSTM memory cell 432 receives the cell state $C_{t-1}$ and output score $h_{t-1}$ of LSTM memory cell at a previous time step, thus retaining temporal learner values of prior states. The example LSTM memory cell 432 also receives input $x_t$, which represents an input vector of embedded information for frames, music, or phrases. The LSTM memory cell 432 includes an input gate $i_t$, a forget gate $f_t$, and an output gate $o_t$.

The temporal learner values are values that determine how long data remains in the LSTM memory cell. The forget gate $f_t$ controls the temporal learner values and determines how much of the information from the LSTM memory cell of the previous time step will be used or thrown away. The forget gate $f_t$ can maintain information within the LSTM memory cell for short or long periods of time, or time steps. The forget gate $f_t$ can be calculated using the following equation (which is depicted by the left portion of the LSTM memory cell 432):

$$f_t = \sigma(h_{t-1} * x_t)$$

The input gate $i_t$ is a determination of an amount (e.g., percentage) of the input that will be processed by the LSTM memory cell. Thus, the input gate $i_t$ can be calculated using the following equation (which is depicted by the middle portion of the LSTM memory cell 432):

$$i_t = \sigma(h_{t-1} * x_t)$$

The $\tilde{C}_t$ represents candidate values for the cell states at the current time step. The candidate state value $\tilde{C}_t$ can be calculated using the following equation (which is depicted by the middle portion of the LSTM memory cell 432):

$$\tilde{C}_t = \tanh(h_{t-1} * x_t)$$

The output gate $o_t$ determines how much of the processed information will be outputted from the LSTM memory cell. Thus, the output gate $o_t$ can be calculated using the following equation (which is depicted by the right portion of the LSTM memory cell 432):

$$o_t = \sigma(h_{t-1} * x_t)$$

Then, the new cell state for the LSTM memory cell 412 can be determined (which is depicted by the top portion of the LSTM memory cell 432):

$$C_t = i_t * \tilde{C}_t + f_t * C_{t-1}$$

The new output score for the LSTM memory cell 412 can also be determined (which is depicted by the bottom right portion of the LSTM memory cell 432):

$$h_t = o_t * \tanh(C_t)$$

The three gates (input gate $i_t$, forget gate $f_t$, output gate $o_t$) can be composed of a sigmoid layer and a multiplication operation. The sigmoid layer can be used in LSTMs to control the gates. For example, the sigmoid layer can control the gates to determine whether to allow the full, part, or none of the values to pass. The sigmoid layer outputs a number between 0 and 1, and when multiplied by this number, the output of the gates can range from allowing nothing (sigmoid layer is 0 and thus the input to the multiplication operation is multiplied with 0) to everything (sigmoid layer is 1 and thus the input to the multiplication operation is multiplied with 1). The sigmoid layer of the input gate control how much of the cell state and output scores of the LSTM memory cells in previous time steps will be used in the LSTM memory cell computation. The sigmoid layer of the forget gate controls how much of the previous cell state and output score data will be used to influence the current LSTM memory cell, and thus controlling the temporal learner values within the LSTM memory cells. The output gate controls how much of the output score will be outputted from the LSTM memory cell.

In some embodiments, the LSTM neural network 400 may receive input in a different format that input vectors of features extracted from video frames. For example, the input may be the video signal itself (or some portion thereof), and LSTM memory cells of the LSTM neural network 400 can process the signal into a form usable by the LSTM neural network 400. In some embodiments, embedded information indicative of a characteristic of a video frame is inputted into the LSTM neural network 400.

As described above, an LSTM neural network can be used to generate new video scripts for an advertisement that best targets a particular viewer. The LSTM neural network is well suited to encode video frames while preserving syntactic, semantic, and discourse coherence, and can learn to classify, process, and predict a series of videos. A temporal learner model or a sequential learner model may be used. However, other methods, techniques, models or types of systems can be used to generate output scores for video frames and/or generate video scripts. For instance, a Bayesian network or a probability model, such as a Markov model or other stochastic model, can be used to determine an output score of a video frame.

Figure 5A:
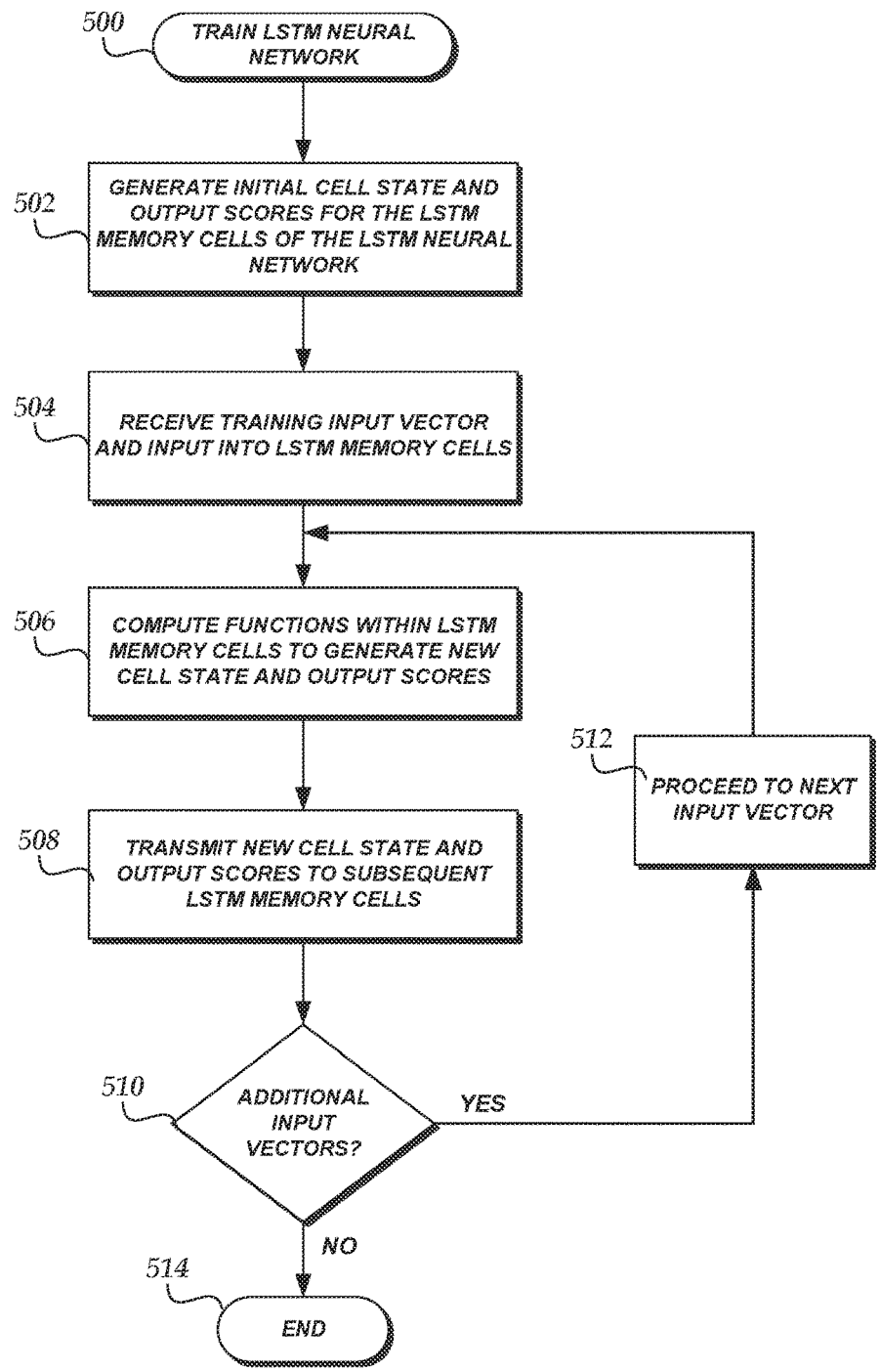
FIGS. 5A and 5B are flow diagrams depicting illustrative methods for training an LSTM neural network that may be implemented by the computing system of FIG. 3 to generate video scripts in accordance with the present disclosure.

FIG. 5A is a flow diagram depicting an illustrative method 500 for training an LSTM neural network using training data. With reference to FIG. 3, the illustrative method 500 may be implemented by the training module 328 as executed by the processing unit 304. By using the method 500, the LSTM neural network can be trained using training data from the training data store 332. Accordingly, the LSTM neural network can be trained for a particular attribute of a theme, such as the "outdoors" attribute of the first theme 110. The LSTM neural network can also be trained for multiple attributes of a theme, such as all of the attributes of the first theme 110.

The method 500 begins at block 502 and proceeds to block 502 where the LSTM neural network to be trained is accessed. In the illustrated example, the neural network to be trained is an LSTM neural network and includes LSTM memory cells. The flow begins by generating initial cell state and output scores for the LSTM cells of the LSTM neural network. The initial cell state and output scores can alternatively be received, accessed, retrieved and the like (e.g., received from training a previous LSTM neural network).

At block 504, the training module 328 receives a training input vector from the training data store 332. The training input vector can represent embedded information for a video frame, music, or text, or can be other data related to a video, music, text, and the like. The training input vector is inputted into the LSTM memory cells. At block 506, the processing unit 304 computes the functions within the LSTM memory cells to generate new cell state and output scores. Then at block 508, the new cell state and output scores are transmitted to subsequent LSTM memory cells to be used in the computation of functions within the LSTM memory cells in subsequent time steps. The new cell state and output scores that are passed to the LSTM memory cells for the next time step retains information on the input vectors of the previous time step, and thus, the LSTM is being trained to associate output scores with the input vectors.

At block 510, the processing unit 304 determines if there are additional input vectors in the training data. If there are, then the flow diagram repeats at block 506 by proceeding to the next input vector 512. Otherwise, the flow diagram ends at block 514.

Figure 5B:
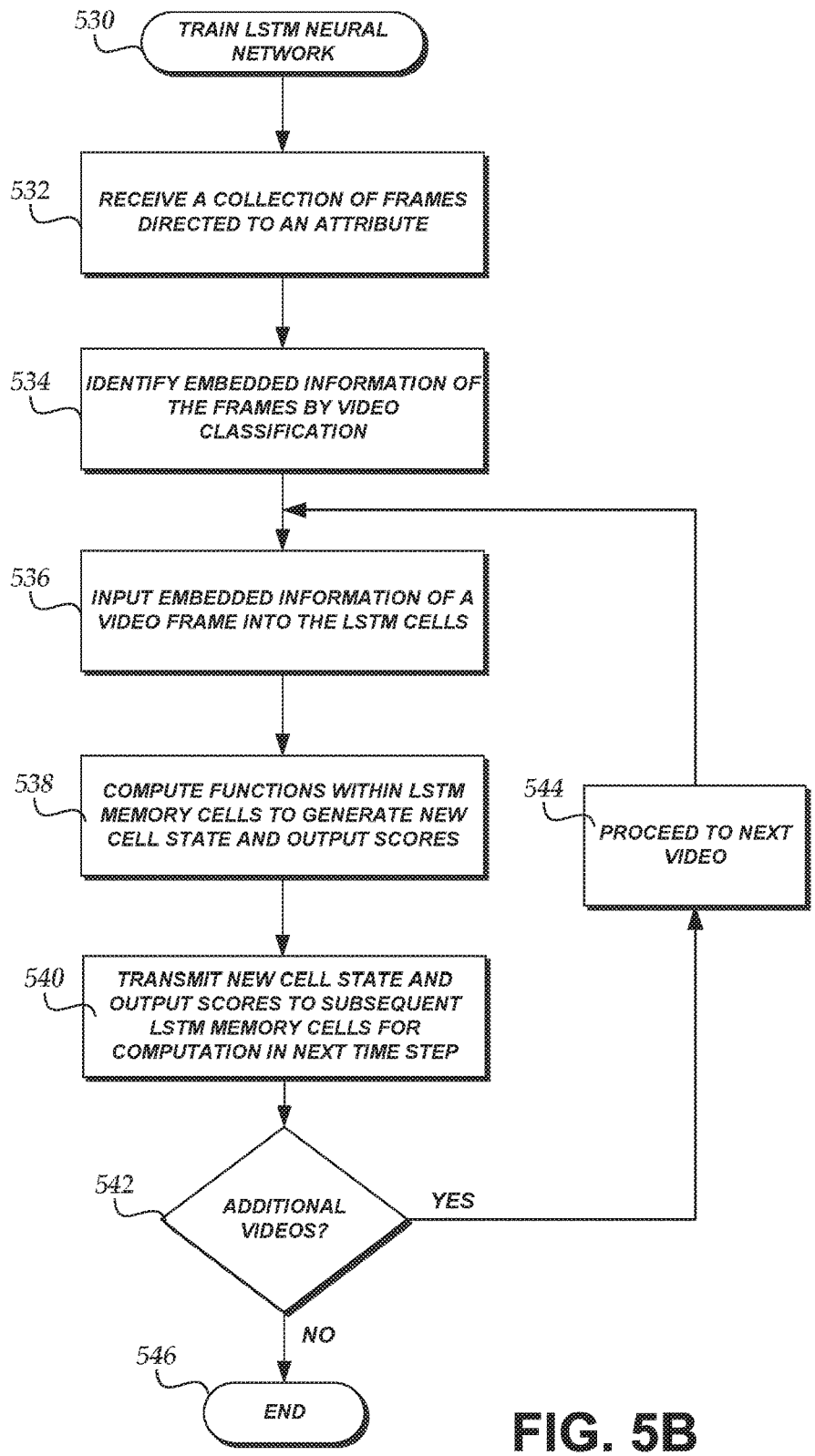

FIG. 5B is a flow diagram depicting an illustrative method 530 for training a LSTM neural network using a collection of videos directed to a viewer. With reference to FIG. 3, the illustrative method 530 may be implemented by training module 328 as executed by the processing unit 304. By using the method 530, the LSTM neural network can be trained using a collection of videos directed to a particular viewer, a group of viewers, or a theme. Accordingly, the LSTM neural network can be trained for a particular attribute of a theme, such as the "outdoors" attribute of the first theme 110. The LSTM neural network can also be trained for multiple attributes of a theme, such as all of the attributes of the first theme 110.

The method 530 begins at block 532, where the LSTM neural network to be trained is accessed. At block 532, a collection of frames directed to an attribute is received, and at block 534, embedded information for each of the frames is identified. This process can be performed by video classification, image recognition, and the like. At block 536, the embedded information for a video frame is inputted into the LSTM cells. Then at block 538, new cell state and output scores are determined by computing the computations within the LSTM memory cell. The computations can be the ones shown in FIGS. 4A and 4B. However, other variations of LSTM neural networks, or other networks, can be performed, that may result in different computations and types of outputs of the cells.

At block 540, the new cell state and output scores are transmitted to subsequent LSTM memory cells to be used in processing computation in the next time step, carrying over temporal learner values. The new cell state and output scores that are passed to the LSTM memory cells for the next time step retains information on the video frames that is directed to the person of the previous time step, and thus the LSTM is being trained to associate output scores with the videos that are already known to be directed to a particular person.

At block 542, the processing unit 304 determines if there are additional videos directed to a person. If so, then the flow diagram repeats at block 536 by proceeding to the next video at block 544. Otherwise, the flow diagram ends at block 546.

Figure 6:
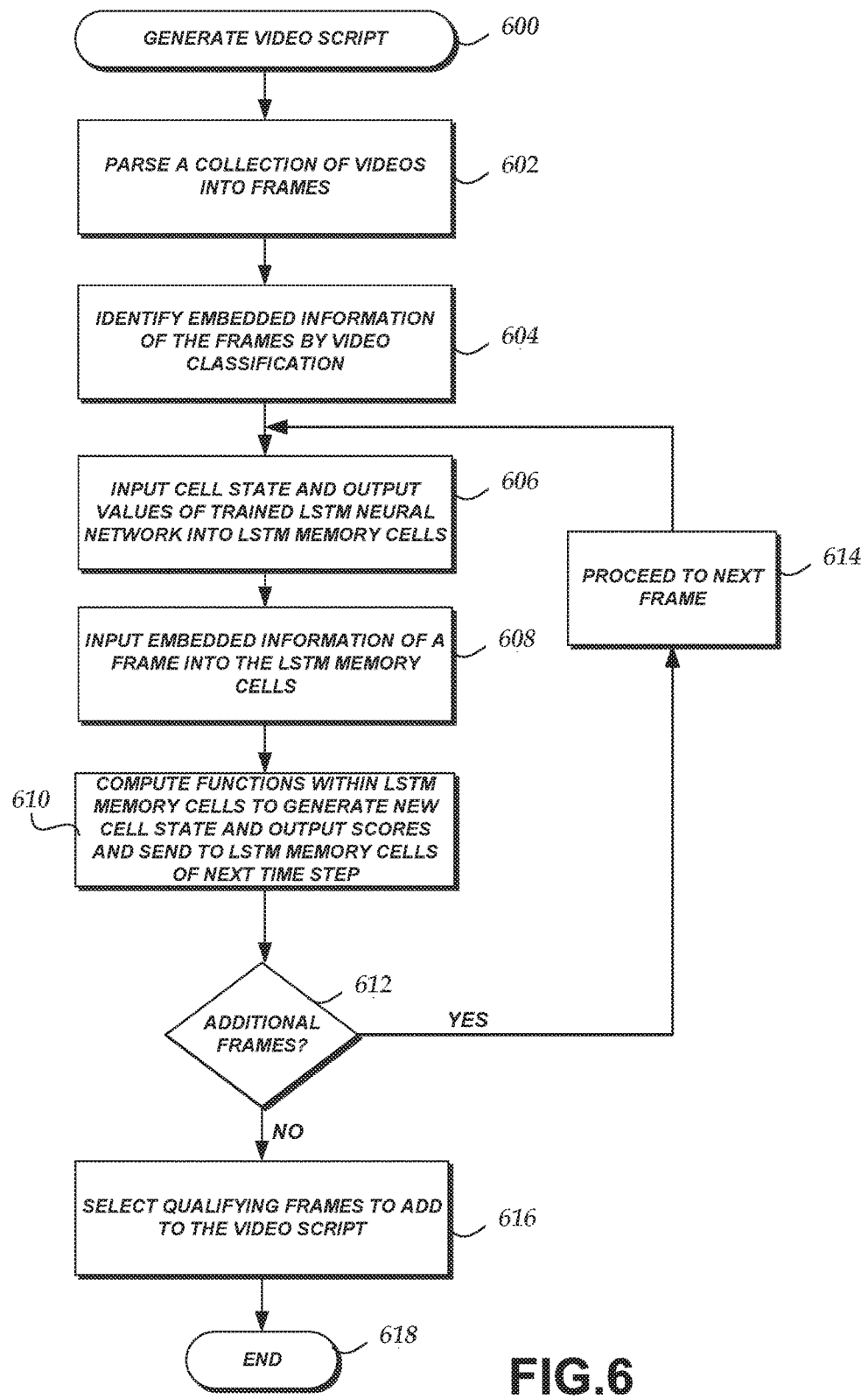
FIG. 6 is a flow diagram depicting an illustrative method for generating a video script using a trained LSTM neural network.

FIG. 6 is a flow diagram depicting an illustrative method 600 for generating a video script using a trained LSTM neural network. The trained LSTM neural network can be in accordance with the trained LSTM neural network in FIGS. 4A and 4B. With reference to FIG. 3, the illustrative method 600 may be implemented by the scripting module 326 as executed by the processing unit 304.

The method 600 begins at block 602, where a collection of video frames is parsed into individual video frames. In other embodiments, individual video frames of a collection may be directly accessed without the need to parse. In block 604, embedded information for each of the video frames is identified, such as the embedded information 104, 108, 114, 118, 122, 134, 138, 142, 154, 158, 162 described in FIGS. 1 and 2. For example, image recognition technology can be used to determine that a horse is included in the video frame, or that the video frame includes a fireplace, a dog, or a sofa. In other embodiments, the embedded information for each video frame may have already been identified or extracted, and thus, can be separately accessed. In these embodiments, the method 600 can begin at block 606 by already having access directly to embedded information.

In block 606, cell state and output scores of the prior LSTM neural network from a prior time step is inputted into the LSTM memory cells of the LSTM neural network. In other embodiments, cell state and output values from trained LSTM neural networks can be used, cell state and output values can be accessed or generated otherwise.

At block 608, the embedded information for a video frame is inputted into LSTM neural network, e.g., a neural network that has been trained as described in connection with FIG. 4A or 4B. As described in connection to video script 1 of FIGS. 1 and 2, after adding frame 112, a video frame (e.g., frame 116) is inputted into the LSTM neural network.

At block 610, the trained LSTM neural network performs computations of the LSTM memory cells to generate cell state and output scores for the video frame based on the embedded information for the video frame. The generated output score is indicative of an association of the video frame to an attribute of a theme, a theme, a person, or characteristics of base frames. Then, the LSTM neural network can transmit the cell state and output scores to the next set of LSTM memory cells for computation in the next time step.

Next, at block 612, if additional video frames of the source material exist, then the scripting module 326 proceeds to the next video frame at block 614, and repeats blocks 606-612 until all of the video frames from the source material are processed and an output score has been generated for each video frame. For example, frames 120, 132, 136, and the like of FIGS. 1 and 2 are inputted into the LSTM neural network and output scores generated.

Once the output scores have been generated for the all of the frames, at block 616, one or more frames each with a qualifying output score can be added. In some embodiments, such as the one described in FIG. 6, one or more frames with the highest output scores are added to the video script. However, it is appreciated that other methods of identifying frames to add are appreciated. For example, the qualifying score may be determined based on an algorithm, a combination of scores, scores that meet a particular fixed or computed threshold, and the like. The frame can be added to the end of the script, at the beginning, or in the middle of the script. A portion of the frame, instead of the entire frame, can also be added.

For example, frames 116 and 120 are associated with output scores of 80 and 86, while the other frames 132, 136, 140, 152, 156, and 160 are associated with an output scores of 50, 40, 30, 33, 35, and 37. The output scores of frames 116 and 120 are indicative of a stronger association between the characteristics of frame 116 and 120 to the attributes of first theme 110. Because frames 116 and 120 have characteristics that are most similar to the attributes of the first theme 110, frames 116 and 120 generated the highest output scores, Therefore, frames 116 and 120 are added to the video script 1.

Figure 7:
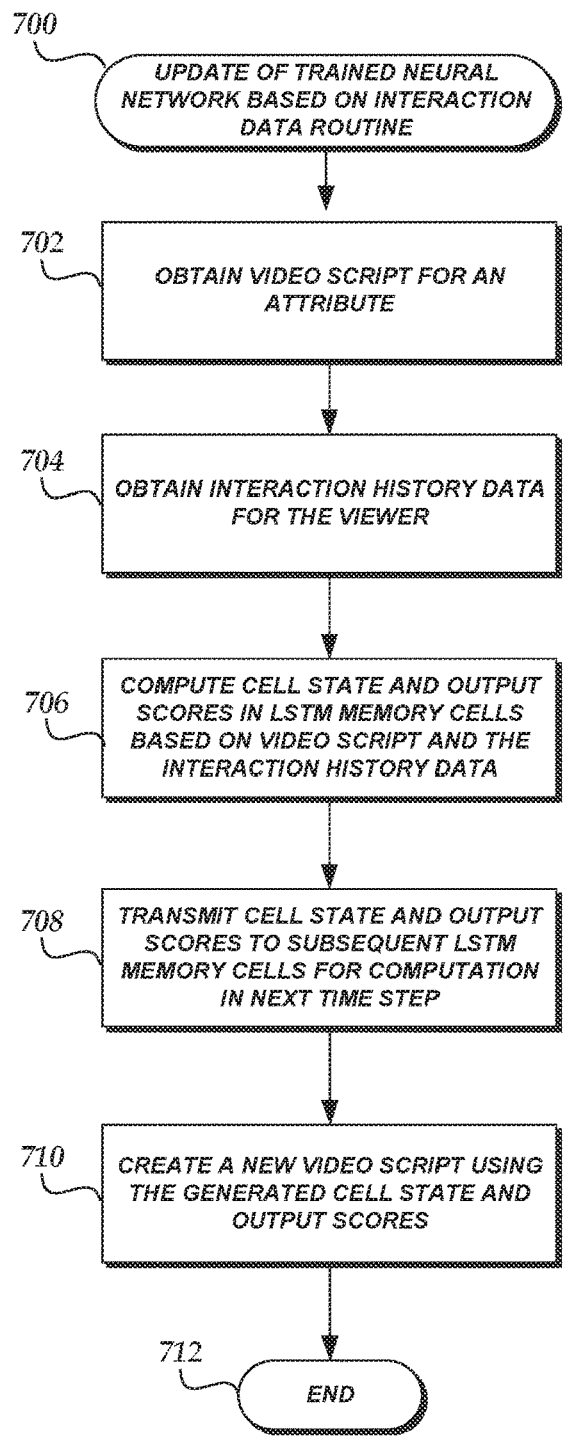
FIG. 7 is a flow diagram depicting an illustrative method for updating the trained LSTM neural network based on viewer interaction with a video script.

FIG. 7 is a flow diagram depicting an illustrative method 700 for updating a trained ISM neural network based on viewer interaction history data. With reference to FIG. 3, the illustrative method 700 may be implemented by the feedback learning module 330 as executed by the processing unit 304. By using the method 700, the processing unit 304 executes the feedback learning module 330 to update a LSTM neural network based on the feedback received from the viewer. The feedback may include interaction data of the viewer when the video script is presented to a person device.

The method begins at block 702, where a video script for an attribute, a particular viewer or theme is obtained. The video script may be a video script generated using method 600, and shown as video scripts 1, 2, or 3 of FIGS. 1 and 2.

In block 704, viewer interaction history data is obtained. The viewer interaction history data may include data that indicates the viewer's response to the video script. For example, the viewer interaction history data may be that the viewer clicks on the advertisement, keeps the browser over the script until the end, searches for the song associated with the advertisement, the popularity of the video script, the time or day of viewing, time stamps of the interaction, options chosen for viewing (e.g., full-screen mode), other viewer interaction, other general interaction, other history data of the video script, and the like.

In block 706, cell state and output scores are computed based on the video script and interaction history data. In some embodiments, the LSTM memory cells will adjust its temporal learner values to retain embedded information associated with a higher degree of interaction from the person while forgetting embedded information associated with a lower degree of interaction.

At block 708, the LSTM memory cells transmit the cell state and output scores computed at block 706 to the subsequent LSTM memory cells for computation in the next time step, adding to the LSTM memory cells in the next time step the temporal learner the values of the prior computations in the current LSTM memory cells. At block 710, the updated LSTM memory cells with the computed cell state and output scores can then be used to create a new video script.

The feedback learning module 330 may be executed by the processing unit 304 to be applied to a single viewer. The feedback learning module 330 may also be applied across multiple viewers that share a theme (or an attribute of a theme). For example, if 90% of a thousand teenagers enjoyed a certain video script or video frame, then the LSTM neural network trained to identify video frames associated with a teenager may be updated to increase the score of videos similar to the one enjoyed by the 90%.

The updated LSTM neural network is created to update the trained LSTM neural network to reflect the degree of a viewer's interaction with the video script. For example, if the viewer quickly scrolled passed the video script, then the LSTM neural network may be updated to produce a lower score for similar video frames that were included in the video script, or a lower score for the particular video frame that was playing when the person scrolled away. On the other hand, if the person were to continue watching the video frame, watch it in full-screen mode, click the video, and makes a purchase, then the feedback learning module 330 may update the LSTM neural network to produce a higher output score for other similar video frames.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without viewer input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices, Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
   a non-transitory computer-readable memory storing computer-executable instructions; and
   a computer processor in communication with the non-transitory computer-readable memory, wherein the computer processor is programmed by the computer-executable instructions to at least:
   identify embedded information in each video frame of a plurality of video frames, wherein the embedded information in each video frame is indicative of a characteristic of the video frame;
   identify, based at least in part on a first attribute of a viewer, a first theme associated with a first attribute;
   create a first video script of video frames directed to the first theme using a first trained long short-term memory ("LSTM") neural network, the first trained LSTM neural network comprising a first plurality of LSTM memory cells configured to store previously generated outputs of the first trained LSTM neural network, each of the first plurality of LSTM memory cells comprising an input gate having a sigmoid layer, wherein to create the first video script the computer processor is programmed by the computer-executable instructions to at least:
   input the embedded information for each video frame into the first trained LSTM neural network;
   generate a first output score for each video frame using the first trained LSTM neural network, the respective first output score for each video frame being indicative of an association between the characteristic of the video frame and the first attribute of the first theme, wherein the first output score for at least one video frame is based at least in part on the previously generated outputs of the first trained LSTM neural network, and wherein the sigmoid layer of the input gate controls how much the previously generated outputs influence the first output score; and
  aggregate video frames with first output scores that satisfy a first threshold into the first video script directed to the first theme;
identify, based at least in part on a second attribute of the viewer, a second theme associated with a second attribute; and
create a second video script of video frames directed to the second theme using a second trained LSTM neural network, the second trained LSTM neural network comprising a second plurality of LSTM memory cells configured to store previously generated outputs of the second trained LSTM neural network, wherein to create the second video script the computer processor is programmed by the computer-executable instructions to at least:
  input the embedded information for each video frame into the second trained LSTM neural network;
  generate a second output score for each video frame using the second trained LSTM neural network, the second output score for each video frame being indicative of an association between the characteristic of the video frame and the second theme; and
  aggregate video frames with second output scores that satisfy a second threshold into the second video script directed to the second theme.

2. The system of claim 1, wherein the computer processor is further programmed by the computer-executable instructions to at least:
update the first trained LSTM neural network, wherein to update the first trained LSTM neural network, the computer processor is programmed by the computer-executable instructions to at least:
  obtain viewer interaction history data indicative of the viewer's interaction with the first video script;
  determine, from the viewer interaction history data, a degree of the viewer's interaction with the first video script; and
  update the first trained LSTM neural network based at least in part on the degree of the viewer's interaction with the first video script.

3. The system of claim 1, wherein the computer processor is further programmed by the computer-executable instructions to at least:
generate the first trained LSTM neural network from training data, wherein to generate the first trained LSTM neural network, the computer processor is programmed by the computer-executable instructions to at least:
  obtain the training data, wherein the training data comprises a training input vector for input into a first LSTM neural network, and wherein the training input vector is indicative of embedded information for a video frame directed to the first theme;
  input the training input vector to one or more LSTM memory cells of the first LSTM neural network; and for each of the one or more LSTM memory cells of the first LSTM neural network,
  generate a new cell state and an initial output score for the LSTM memory cell; and
  transmit the new cell state and the initial output score to a corresponding LSTM memory cell in the first trained LSTM neural network.

4. The system of claim 1, wherein the computer processor is further programmed by the computer-executable instructions to at least:
generate the first trained LSTM neural network from a commonality identified in a plurality of training video frames, wherein to generate the first trained LSTM neural network, the computer processor is programmed by the computer-executable instructions to at least:
  identify embedded information in each video frame of a plurality of training video frames, wherein the plurality of training video frames have already been identified as associated with a particular attribute of the first theme;
  identify the commonality in the embedded information across the plurality of training video frames, wherein the commonality is indicative of the particular attribute of the first theme; and
  update the first trained LSTM neural network based at least in part on the commonality.

5. The system of claim 1, wherein the computer processor is further programmed by the computer-executable instructions to at least:
determine that a potential viewer is associated with the first theme or the second theme;
in response to determining that the potential viewer is associated with the first theme, select the first video script to display to the potential viewer; and
in response to determining that the potential viewer is associated with the second theme, select the second video script to display to the potential viewer.

6. A computer-implemented method comprising:
under control of a computing device configured to execute specific computer-executable instructions,
  identifying embedded information in each content frame of a plurality of content frames, wherein the embedded information in each content frame is indicative of a characteristic of the content frame;
  creating a first script of content frames directed to a first attribute, wherein creating the first script comprises:
    determining a first output score for each content frame using a trained long short-term memory ("LSTM") neural network, the trained LSTM neural network comprising a plurality of memory cells configured to store output scores previously determined by the trained LSTM neural network, each of the plurality of memory cells comprising an input gate having a sigmoid layer, the respective first output score for each content frame being indicative of an association between the characteristic of the content frame and the first attribute, wherein the first output score for at least one content frame is determined based at least in part on a previous output score that was determined by the trained LSTM neural network for a previous content frame, and wherein the sigmoid layer of the input gate controls how much of the previous output score is used to determine the first output score;
    comparing the first output scores to a first threshold; and aggregating content frames each with a first output score that satisfies the first threshold into the first script directed to the first attribute.

7. The computer-implemented method of claim 6 further comprising creating a second script of content frames directed to a second attribute, wherein creating the second script comprises:
   determining a second output score for each content frame using the trained long short-term memory ("LSTM") neural network, the respective second output score for each content frame being indicative of an association between the characteristic of the content frame and the second attribute; and
   aggregating content frames each having a qualifying second output score into the second script directed to the second attribute.

8. The computer-implemented method of claim 7 further comprising:
   determine that a potential viewer is associated with the first attribute or the second attribute;
   in response to determining that the potential viewer is associated with the first attribute, select the first script to display to the potential viewer; and
   in response to determining that the potential viewer is associated with the second attribute, select the second script to display to the potential viewer.

9. The computer-implemented method of claim 6 further comprising updating the first output score, wherein updating the first output score comprises:
   obtaining viewer interaction history data indicative of interaction between a viewer and the first script;
   determining, from the viewer interaction history data, a degree of interaction between the viewer and the first script; and
   determining at least one first output score based at least in part on the degree of interaction between the viewer and the first script.

10. The computer-implemented method of claim 6, wherein the first script comprises an advertisement script for display to a viewer associated with the first attribute.

11. The computer-implemented method of claim 6, wherein a first theme comprises the first attribute, and the first output score generated for each content frame indicates a degree of association between the characteristic of the content frame and the first attribute of the first theme.

12. A system comprising:
   a non-transitory computer-readable memory storing computer-executable instructions; and
   a computer processor in communication with the non-transitory computer-readable memory, wherein the computer processor is programmed by the computer-executable instructions to at least:
      add a first video frame to a first script directed to a first attribute, wherein to add the first video frame the computer processor is programmed by the computer-executable instructions to at least:
         input data associated with each video frame of a plurality of video frames into a first temporal learner model, the first temporal learner model comprising a plurality of memory cells configured to store previous outputs of the first temporal learner model, each of the plurality of memory cells comprising a plurality of gates, each of the plurality of gates comprising a sigmoid layer;
         generate a first output score for each video frame using the first temporal learner model, the respective first output score for each video frame being indicative of an association between a characteristic of the video frame and the first attribute, wherein the first output score for at least one video frame is based at least in part on a previous output of the first temporal learner model stored in a first memory cell of the plurality of memory cells, and wherein the previous output corresponds to the first output score of a previous video frame;
         identify a video frame having a qualifying first output score among the plurality of video frames as the first video frame; and
         add the first video frame to the first script.

13. The system of claim 12, wherein a first theme comprises the first attribute, and the first output score generated for each video frame indicates a degree of association between the video frame and the first attribute of the first theme.

14. The system of claim 12, wherein the computer processor is further programmed by the computer-executable instructions to at least:
   add a second video frame to a second script directed to a second attribute, wherein to add the second video frame the computer processor is programmed by the computer-executable instructions to at least:
      input the data associated with each video frame of the plurality of video frames into a second temporal learner model;
      generate a second output score for each video frame using the second temporal learner model, the respective second output score for each video frame being indicative of an association between the characteristic of the video frame and the second attribute;
      identify a video frame having a qualifying second output score among the plurality of video frames as the second video frame; and
      add the second video frame to the second script.

15. The system of claim 14, wherein the computer processor is further programmed by the computer-executable instructions to at least:
   determine that a potential viewer is associated with the first attribute or the second attribute;
   in response to determining that the potential viewer is associated with the first attribute, select the first script to display to the potential viewer; and
   in response to determining that the potential viewer is associated with the second attribute, select the second script to display to the potential viewer.

16. The system of claim 12, wherein the computer processor is further programmed by the computer-executable instructions to at least:
   update the first temporal learner model to produce an output score wherein to update the computer-executable instructions the computer processor is programmed by the computer-executable instructions to at least:
      obtain history data indicative of interaction data with the first script;
      compute a temporal learner value and an output score; and
      update the computer-executable instructions by inputting the temporal learner value and an output score to a subsequent temporal learner model for computation in a next time step.

17. The system of claim 12, wherein the computer processor is further programmed by the computer-executable instructions to at least:

add a first audio segment to the first script, wherein to add the first audio segment the computer processor is programmed by the computer-executable instructions to at least:
   determine an audio output score for each audio segment of a plurality of audio segments using the first temporal learner model, the audio output score for each audio segment being indicative of an association between a characteristic of the audio segment and the first attribute;
   identify an audio segment having a qualifying audio output score among the plurality of audio segments as the first audio segment; and
   add the first audio segment to the first script.

18. The system of claim 12, wherein the computer processor is further programmed by the computer-executable instructions to at least:
add a first text portion to the first script, wherein to add the first text portion the computer processor is programmed by the computer-executable instructions to at least:
   determine a text output score for each text portion of a plurality of text portions using the first temporal learner model, the text output score for each text portion being indicative of an association between a characteristic of the text portion and the first attribute;
   identify a text portion having a qualifying text output score among the plurality of text portions as the first text portion; and
   add the first text portion to the first script.

19. The system of claim 12, wherein prior to adding the first video frame to the first script, the computer processor is programmed by the computer-executable instructions to at least:
identify data associated with a base frame, wherein the base frame comprises an already existing video frame in the first script, and wherein the data associated with the base frame is indicative of a characteristic of the base frame;
wherein the first output score for each video frame that is generated by the first temporal learner model is indicative of an association between the characteristic of the base frame, the characteristic of the video frame, and the first attribute.

20. The system of claim 12, wherein the first temporal learner model is a long short-term memory neural network.

* * * * *